US005079676A

United States Patent [19]

Lisak

[11] Patent Number: 5,079,676
[45] Date of Patent: Jan. 7, 1992

[54] HEADLAMP ADJUSTING ASSEMBLY

[75] Inventor: Stephen P. Lisak, Arab, Ala.

[73] Assignees: Ryder International Corporation, Arab, Ala.; Textron Inc., Providence, R.I.

[21] Appl. No.: 517,232

[22] Filed: May 1, 1990

[51] Int. Cl.⁵ .............................................. B60Q 1/06
[52] U.S. Cl. ...................................... 362/61; 362/424; 362/66; 362/270; 81/484
[58] Field of Search ............... 362/61, 80, 66, 269, 362/270, 273, 275, 418, 427, 428, 430, 424, 425, 419; 81/484

[56] References Cited

U.S. PATENT DOCUMENTS

| 4,108,025 | 8/1978 | Stine et al. | 81/3 R |
|---|---|---|---|
| 4,665,469 | 5/1987 | Furfari et al. | 362/66 |
| 4,674,018 | 6/1987 | Ryder et al. | 362/424 |
| 4,689,725 | 8/1987 | Saijo et al. | 362/66 |
| 4,713,739 | 12/1987 | Ryder et al. | 362/424 |
| 4,796,494 | 1/1989 | Eckenrode et al. | 81/484 |
| 4,843,523 | 6/1989 | Nakamura | 362/275 |
| 4,882,658 | 11/1989 | Allen | 362/275 |
| 4,893,210 | 1/1990 | Lisak | 362/66 |
| 4,916,587 | 4/1990 | Hirose et al. | 362/66 |

Primary Examiner—Ira S. Lazarus
Assistant Examiner—D. M. Cox
Attorney, Agent, or Firm—Trexler, Bushnell, Giangiorgi & Blackstone

[57] ABSTRACT

A mechanism for adjusting the orientation of vehicle headlamps or the like includes a molded gear housing having a gear journaling bore for rotation of an adjusting gear journaled therein, and an adjusting member movably coupled to the adjusting gear such that rotation of the adjusting gear imparts linear movement to the adjusting member for the headlamp adjustment. The housing also includes aperture means through which the adjustment member slidably extends, and the aperture means cooperates to prevent rotation of the adjusting member during the linear movement thereof. Additional features of the preferred adjusting mechanism provide a drive shaft and drive gear meshed to drive rotation of the adjusting gear. The drive shaft extends through a cap portion of the housing for manual access to the shaft, and the cap bears against an annular retainer portion on the drive shaft in order to prevent retraction of the shaft from the drive gear and the housing.

15 Claims, 2 Drawing Sheets

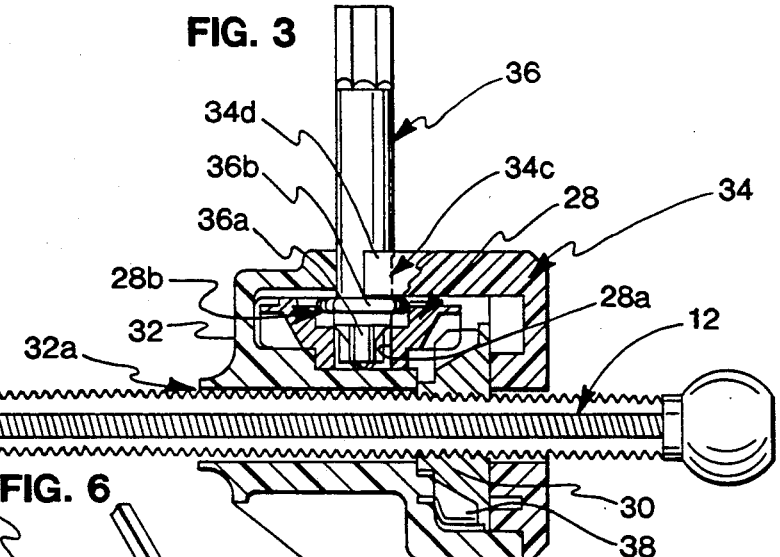
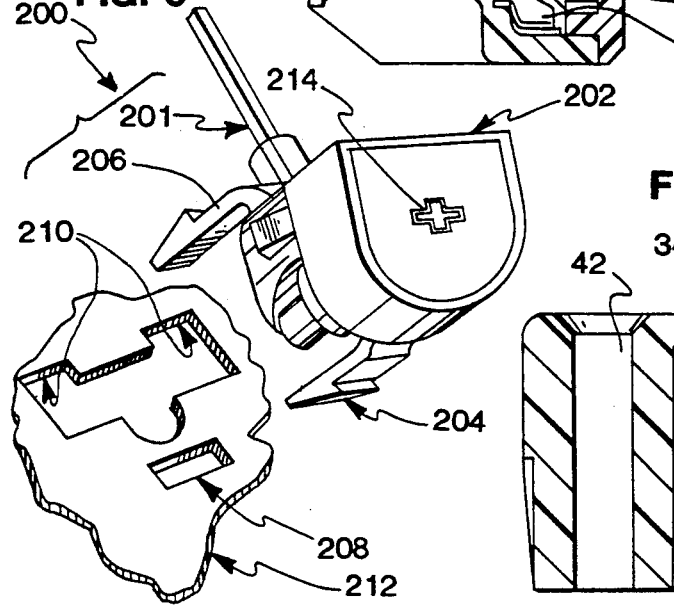
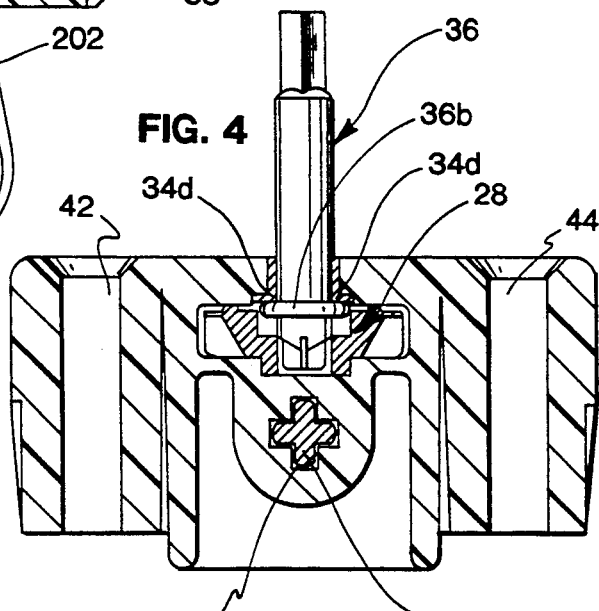
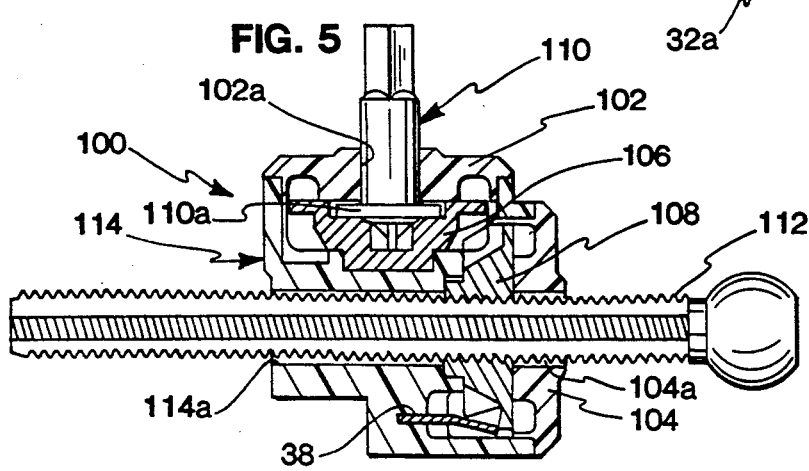

HEADLAMP ADJUSTING ASSEMBLY

BACKGROUND OF THE INVENTION

The present invention relates to adjusting mechanism for automobile headlamps or the like, and more particularly relates to an improved assembly and construction of such mechanisms.

Particularly successful modern adjusting mechanism for vehicle headlamps are described for example in U.S. Pat. Nos. 4,674,018 and 4,893,219. In the described mechanisms, an adjusting screw is coupled to the headlamp housing and extends into a gear box or adjustment mechanism. The adjusting screw is operatively coupled to an adjusting drive shaft which is operated by conventional hand tools, by means of a pair of mitered gears and a threaded connection. The gear members can be assembled and sealed within the integral gear housing, while allowing the drive shaft and adjusting screw components to be assembled at a later time with a variety of shaft and screw lengths as required for different model automobiles. Preferably, the adjusting screw is prevented from rotating so that its motion is limited to linear translation to pivot the headlamp housing to a desired orientation. In order to prevent rotation of the adjusting screw, the end of the screw can be provided with radial ears which are received within slots formed in the headlamp housing, although in service the ears are subject to failure under the stress of resisting rotational torque. An alternative arrangement has been proposed in U.S. Pat. No. 4,796,494 in which the adjusting screw is provided with an elongate flat which slidably engages a projection of the drive gear to prevent the adjusting screw from rotating. The drive gear thus requires complex fabrication to produce the necessary configuration for cooperating with the flat on the adjusting screw. Also, the metal-to-metal engagement of this design is undesirable as it can produce galling or electrolytic corrosion. These disadvantages are eliminated by adjustment mechanisms in accordance with the present invention.

SUMMARY OF THE INVENTION

In accordance with the present invention, a mechanism for adjusting the orientation of vehicle headlamps or the like includes a molded gear housing having a gear journaling bore for accommodating adjusting gear means journaled therein, and an adjusting member movably coupled to the adjusting gear means such that rotation of the adjusting gear means imparts linear movement to the adjusting member which controls the orientation of the headlamp. The housing also includes aperture means through which the adjustment member slidably extends and the aperture means cooperates with the adjustment member to prevent rotation of said adjusting member during the linear movement thereof.

In a preferred embodiment, the adjusting member is a screw which is externally threaded and engages an internally threaded bore of the adjusting gear so that the turning of the adjusting gear produces the linear movement of the adjusting screw, which is held against rotation. While peripherally threaded, the adjusting screw also has a non-circular cross-section, preferably a cruciform-cross-section, and the cooperating aperture means in the housing also has a mating cruciform-cross-section which prevents any rotation of the adjusting screw but allows free translation or linear movement of the adjusting screw through the cruciform aperture.

Additional features of the preferred form of adjusting mechanism provide a drive shaft and a drive gear meshed with the adjusting gear to drive said adjusting gear. The drive shaft extends through a cap portion of the housing for manual access to the shaft. The preferred embodiment also includes a novel structural relationship which serves to hold the drive shaft in mated engagement with the drive gear. More specifically, the cap includes an extension that bears against an annular retainer portion on the drive shaft in order to prevent retraction of the shaft from the drive gear and the housing.

In one configuration, a single cap closes the gear cavity within the housing, and the cap has a pair of spaced arm members which straddle the drive shaft and bear against an annular flange thereon. In a second configuration, the housing has two cap portions which close the respective gear chambers, and the drive shaft projects through an aperture in one of the caps so that the lower surface at the periphery of the cap aperture bears against the annular retainer on the drive shaft to prevent its retraction.

BRIEF DESCRIPTION OF THE DRAWINGS

FIG. 3 is a sectional view of the adjusting mechanism shown in FIGS. 1 and 2;

FIG. 4 is a sectional view of the adjusting mechanism at a plane taken along line 4—4 in FIG. 1;

FIG. 5 is a sectional view of a second embodiment of an adjusting mechanism according to the invention; and FIG. 6 is a perspective view of a third embodiment of the adjusting mechanism showing coupling members for securing the mechanism to an apertured support panel.

DESCRIPTION OF THE ILLUSTRATED EMBODIMENTS

Figure 1:
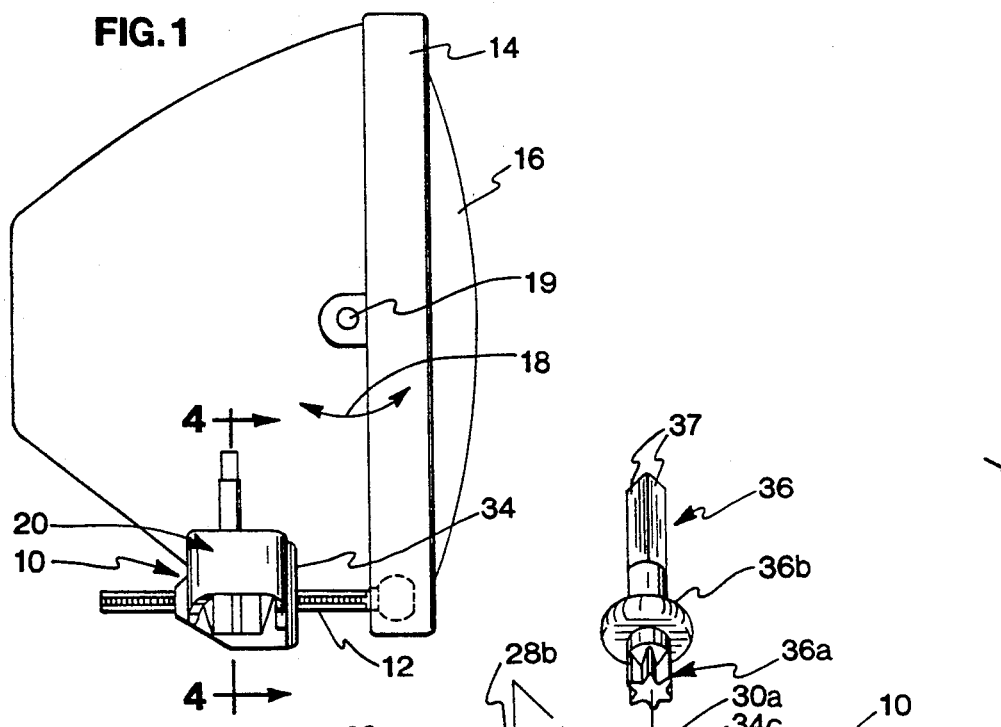
FIG. 1 is a side elevational view of one embodiment of the adjusting mechanism according to invention coupled for adjustment of a headlamp alignment.

Referring to FIG. 1, an embodiment of the adjusting mechanism according to the invention, designated generally by reference character 10, includes an adjusting screw 12 which has its distal end affixed to the headlamp housing 14 which holds the headlamp assembly designated generally 16. The adjusting screw 12 is fixed against rotation as further described hereinafter, and thus can only move linearly in response to rotation of the internal gearing within the mechanism 10. The linear motion of the screw 12 generally by the mechanism 10 causes the headlamp housing 14 to pivot through an arc 18 about a pivot bearing 19 in order to adjust the vertical alignment of the headlamp 16 in the configuration shown in FIG. 1. In practice, additional adjusting mechanisms 10 are employed to attain horizontal adjustment of the headlamp.

Figure 2:
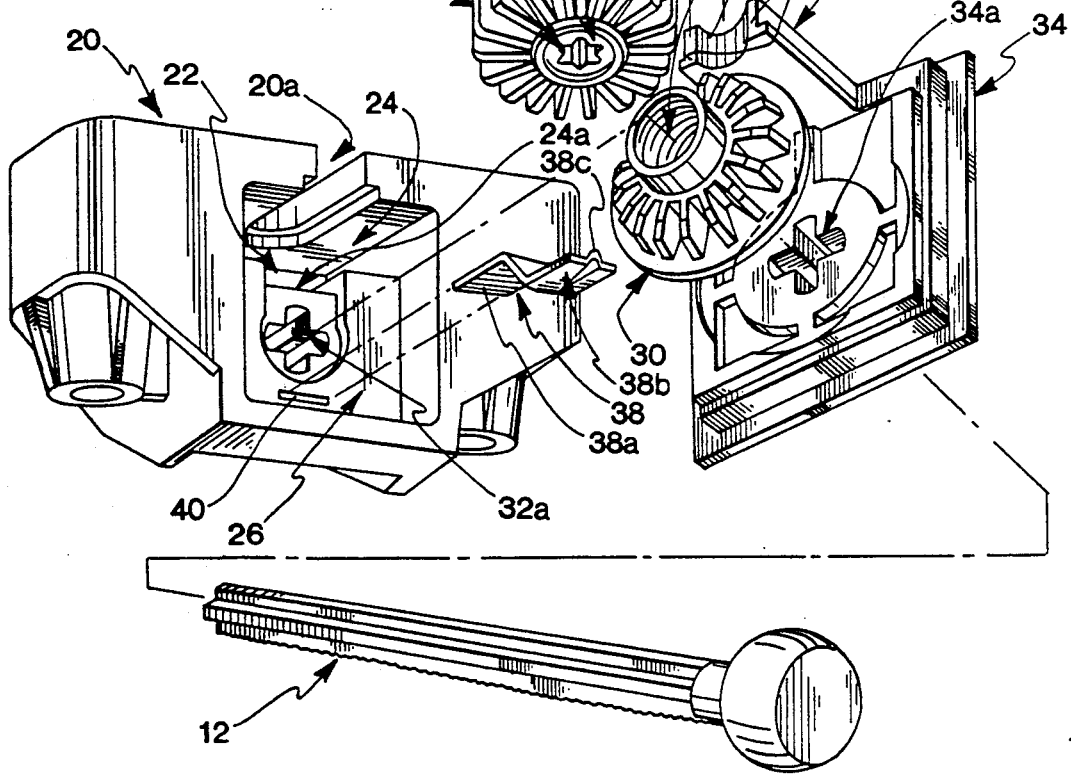
FIG. 2 is an exploded perspective view of the adjusting mechanism shown in FIG. 1.

Referring now to the exploded view in FIG. 2, the adjusting mechanism 10 includes a unitary molded main housing 20 within which a main cavity 22 is formed, having an internal structure providing multiple shoulders and ledges which define a pair of intersecting gear-journaling bores or chambers 24 and 26. The chambers 24 and 26 respectively receive a bevel-meshed drive gear and adjusting gear generally designated by respective reference characters 28 and 30. The gears 28 and 30 are mitered gears and are of relatively standard design.

The adjusting gear 30 has a central, internally threaded bore 30a in which the externally threaded adjusting screw 12 is engaged, and projects from both ends thereof as well as translating through the housing 20 as best shown in FIGS. 1 and 3.

In order to ensure that the adjusting screw is prevented from rotating and is capable of translational motion only upon rotation of the adjusting gear 30, the adjusting screw 12 has a fabricated configuration with a non-circular cross-section, and in the illustrated embodiment the screw 12 has a cruciform cross-section. Although the arms of the cruciform cross-section have threaded peripheral surfaces about which the internal threading 30a of the adjusting screw is engaged to impart the translational force to the adjusting screw, the rear wall 32 of the housing 20 as well as the front cap portion 34 are provided with closely corresponding cruciform-shaped apertures 32a and 34a which provide preventive rotational interference with the screw 12 while allowing translational passage of the screw 12 for proper pivotal motion of the headlamp housing 14 and headlamp 16. The apertures 32a and 34a do not allow any rotation of the screw 12 which could otherwise cause aberrant force tending to misalign the pivot bearing 19. Suitable modifications of the cruciform cross-sectional configuration of the screw 12 can be substituted, for example a cross-section in which a single radially projecting arm is provided, with corresponding modifications in the shape of the housing apertures through which the screw translates while also providing the rotational interference.

As can be appreciated, only one or the other of the cruciform apertures 32a or 34a is required to prevent rotation of the adjusting screw 12. In practice, however, it is preferred that the apertures 32a and 34a closely conform to the cross-sectional shape of the adjusting screw in order to better seal the gear chambers 24 and 26 from the entry of dirt and moisture.

Referring again to FIGS. 1 and 2, the drive gear 28, which drives the adjusting gear 30, is coupled to one end of a drive shaft 36 which can be turned by suitable tooling (not shown) applied to the distal end of the shaft 36 which includes tool engaging surfaces 37. The drive gear 28 has a central, internal multi-lobular configured coupling recess 28a which receives a mating, multi-lobular coupling configuration formed on the received end 36a of the drive shaft 36. In assembling the adjusting mechanism 10, the coupling end 36a of the shaft 36 is inserted into the coupling recess 28a of the drive gear 28, after which the drive gear 28 is slidably inserted into the gear receiving chamber 24 so that the shaft 36 projects through the open slot 20a in the upper wall of the housing 20. The chamber 24 includes a lower socket 24a and bottom walls thereof in which an axial hub 28b of the drive gear 28 is seated to provide accurate alignment and prevent axial displacement of the gear 28. Then the adjusting screw 30 can be inserted into the receiving chamber 26, meshing with the drive gear 28. Both of the gears 28 and 30 as well as the coupled drive shaft 36 will be held in place by the cooperating structure and shoulders of the inner walls of cavity 22 in conjunction with the structure of the cap 34 which is then installed to close the cavity 22 and can be glued or ultrasonically welded to the main housing 20 to seal out moisture and debris. Thus, the gears 28, 30, shaft 36 and cap 34 can be preassembled with the housing 20 in a mass production operation so that the adjusting screw 12 of any desired length can later be installed by translating the screw through the respective housing and cap apertures 32a and 34a as it is fed through the rotating adjusting screw 30 by driving rotation of the shaft 36.

Referring again to FIG. 3, the present invention includes means for maintaining the drive shaft 36 in engagement with the drive gear 28. More specifically, the drive shaft 36 has an annular, radially projecting retainer flange 36b which is inserted into a recess 28b in the drive gear 28 and the coupled end 36a of the shaft is retained within the coupling recess 28a by a tongue-like projecting portion 34b of the cap 34 which has an arcuately concave end portion 34c which receive or partially surround the shank of drive member 36. The end portion 34c bridges two arm formations 34d whose respective lower surfaces bear upon the shaft retainer flange 36b to prevent any retraction of the drive shaft 36 from the gear 28. The cap tongue portion 34b and arms 34d are received within the correspondingly shouldered slot 20a so that the arcuate end portion 34c provides journaling for the shaft 36 which is thus straddled by the tongue arms 34d adjacently above the shaft retainer flange 36b as shown in FIG. 3. In alternative embodiments, the drive shaft 36 and drive gear 28 can be integrally molded to eliminate the need for coupling, or the drive shaft can be insert molded into the gear 28, and in either modification the bearing of the cap tongue 34b against the shaft flange 36b will prevent withdrawal of the drive shaft 36 as well as provide vibrational stability of the drive gear 28 and the meshed adjusting gear 30.

In the illustrated form of the invention, means should be provided for imparting a prevailing torque to the drive system provided by the gears 28 and 30 and the threaded connection between adjusting gear 30 and the adjusting shaft 12. This is necessary to prevent the component parts from moving due to vibration encountered in service, which would result in misalignment of the headlamp 16. In the illustrated form the prevailing torque is supplied by a cantilever spring generally designated by reference character 38. The spring 38 has a base portion 38a which is secured within a receiving slot 40 in the housing 20 as best shown in FIG. 2. The spring 38 also has a projecting tab 38b with a detent 38c which engages with teeth of the adjusting gear 30 to lock this gear against any inadvertent rotation from vibratory forces. When the adjusting mechanism 10 is operated, the drive shaft 36 is turned to impart sufficient force to the drive gear 28 and adjusting gear 30 for overcoming the spring force of the engagement by the detent 38c of the tab 38b so that said tab is deflected away from the gear teeth in cammed manner, freeing the gear 30 for rotation and the translational motion of the adjusting screw 12. Of course, those skilled in the art will recognize that other means could be used to attain the desired prevailing torque, as for example, frictional engagement of the housing or cap with the drive shaft or gear members.

As shown in FIGS. 2 and 4, the housing 20 includes a pair of spaced mounting bores 42 and 44 which are employed to mount the housing 20 upon, for example supporting structure of the vehicle adjacent the headlamp housing 14.

FIG. 5 illustrates a second embodiment 100 of the adjusting mechanism which is similar to the first mechanism embodiment 10 with the exception that separate caps 102 and 104 are provided to cover the drive gear 106 and the adjusting gear 108, respectively. The aperture 102a enables the cap 102 to be slipped over the installed drive shaft 110 and drive gear 106 so that the inner surface of the cap 102 seats against the rotating retainer flange 110a of the drive shaft 110 to prevent vibrational displacement of the drive gear 106 and any retraction of the drive shaft 110. The adjusting screw 112 has a cruciform cross-sectional configuration which is translated through the corresponding cruciform configured apertures 104a in the front cap 104 and the cruciform aperture 114a in the rear wall of the main housing 114 so that the adjusting screw 112 is prevented from rotating when it is translated by the adjusting screw 108.

As shown in FIG. 6, a third embodiment 200 of the adjusting mechanism according o the invention has a drive shaft 201 and a main housing 202 which is provided with three rearwardly projecting, hooked couplers arranged in a pattern in which one coupler 204 projects from the bottom of the housing 202 and a spaced pair of couplers 206, 206 (only one of which is viewable) project from the upper portion of the housing 202. The couplers 204 and 206 are resiliently deflectable to enable a snap fit installation through corresponding coupling apertures 208 and 210 formed through the supporting sheet metal structure 212, or similar support in a vehicle, adjacent the headlamp housing. The couplers 204 and 206 thus lock against the peripheral surfaces of the apertures 208 and 210 and provide three locations of securement to prevent any rotation of the housing 202. A cruciform-shaped aperture 214 is formed through the cap or front wall of the housing 202 to prevent any rotation of the adjusting screw (now shown) which is translated therethrough in the adjusting operation similar to the first and second embodiments of the adjusting mechanism.

In light of the foregoing description of the embodied adjusting mechanisms, modifications will be evident to those skilled in design of such mechanisms and are within the broad scope of the appended claim.

The invention is claimed as follows:

1. An adjusting mechanism for a headlamp comprising: housing means having a gear journaling bore for rotation of an adjusting gear journalled therein; an adjusting member movably coupled to said adjusting gear such that rotation of said adjusting gear imparts linear movement to said adjusting member for adjusting orientation of said headlamp; and aperture means in said housing means and cooperating with said adjusting member slidably extending through said aperture means for preventing rotation of said adjusting member during said linear movement thereof wherein said aperture means has a cross-sectional configuration interfering with rotation of said adjusting member while allowing slidable linear movement of said adjusting member therethrough.

2. An adjusting mechanism according to claim 1, wherein said adjusting member has a cross-sectional configuration including at least one radial projection, and wherein said aperture means configuration includes a radially extending slot receiving said radial projection to define said preventive rotational interference.

3. An adjusting mechanism according to claim 2, wherein said aperture means and adjusting member include mating respective cruciform cross-sectional configurations.

4. An adjusting mechanism according to claim 1, wherein said aperture means is formed in a cap member of said housing means having an interior surface defining one end of said gear journaling bore.

5. An adjusting mechanism according to claim 1, wherein said housing means comprises a main housing member defining said gear journaling bore, and a cap member closing said bore, said aperture means being formed in a wall of the main housing member.

6. An adjusting mechanism for a headlamp comprising: a housing having a gear-journaling bore; a drive gear rotatably journaled in said bore; a drive shaft extending through said housing and having one end thereof operatively and removably coupled with said drive gear within said bore, said drive shaft further including a radially extending retainer portion disposed within said bore adjacent said coupled end thereof; said housing further including a cap portion which is joined thereto to close an outer end of said bore, said retainer portion being located between said cap portion and said drive gear, said cap portion bearing against said retainer portion in order to prevent retraction of said coupled shaft end from said drive gear and housing.

7. An adjusting mechanism according to claim 6, wherein said retainer portion comprises an annular flange and wherein said cap portion includes spaced arm members straddling said drive shaft and bearing against said annular flange.

8. An adjusting mechanism according to claim 6, wherein said cap portion includes an aperture through which said drive shaft extends and wherein a peripheral surface of said cap aperture provides said bearing against said retainer portion of said drive shaft.

9. An adjusting mechanism according to claim 6, wherein said gear housing further comprises a second bore providing rotatable journaling of a second gear therein which is rotatably meshed with said drive gear.

10. An adjusting mechanism according to claim 9, further comprising an adjusting member movably coupled to said second gear such that rotation of said second gear imparts linear movement to said adjusting member for adjusting orientation of said headlamp.

11. An adjusting mechanism for a headlamp comprising: a housing having a gear-journaling bore; a drive gear rotatably journaled in said bore; a drive shaft extending through said housing and having one end thereof operatively coupled with said drive gear within said bore, said drive shaft further including a radially extending retainer portion disposed within said bore adjacent said coupled end thereof; said housing further including a cap portion which is joined thereto to close an outer end of said bore, said cap portion bearing against said retainer portion in order to prevent retraction of said coupled shaft end from said drive gear and housing; said gear housing further comprising a second bore providing rotatable journaling of a second gear therein which is rotatably meshed with said drive gear, and an adjusting member movably coupled to said second gear such that rotation of said second gear imparts linear movement to said adjusting member for adjusting orientation of said headlamp; and, aperture means through said gear housing and cooperating with said adjusting member slidably extending through said aperture means to prevent rotation of said adjusting member during said linear movement thereof.

12. An adjusting member according to claim 11, wherein said adjusting member has a cross-sectional configuration including at least one radial projection, and wherein said aperture means configuration includes a radially extending slot receiving said radial projection to define said preventive rotational interference.

13. An adjusting mechanism according to claim 12, wherein said aperture means and adjusting member include mating respective cruciform cross-sectional configurations.

14. An adjusting mechanism according to claim 11, wherein said aperture means is formed in a removable cap portion of said housing having an interior surface defining one end of said second gear journaling bore.

15. An adjusting mechanism according to claim 6, wherein said housing further comprises a plurality of resiliently deflectable coupling members projecting from said housing for snap-fitted and locking insertion through respective receiving apertures formed in support structure in order to securely mount said housing thereon.

* * * * *